United States Patent
Kadengal

(10) Patent No.: US 6,928,053 B1
(45) Date of Patent: Aug. 9, 2005

(54) DYNAMIC RESOURCE CONTROL IN TELECOMMUNICATIONS NETWORKS

(75) Inventor: Radhakrishnan Kadengal, Harlow (GB)

(73) Assignee: Nortel Networks Limited, St. Laurent (CA)

(*) Notice: Subject to any disclaimer, the term of this patent is extended or adjusted under 35 U.S.C. 154(b) by 882 days.

(21) Appl. No.: 09/745,889

(22) Filed: Dec. 21, 2000

Related U.S. Application Data

(60) Provisional application No. 60/192,757, filed on Mar. 28, 2000.

(51) Int. Cl.⁷ .................. G01R 31/08; G06F 11/00; H04J 1/16; H64J 3/14; H04L 1/00
(52) U.S. Cl. ............. 370/232; 370/468; 370/395.21; 379/114.07; 379/114.1
(58) Field of Search ............ 370/395.21, 465, 370/468, 352, 395.2, 252, 238, 232, 231, 230, 235, 236, 249; 379/114.06–114.09, 114.1; 709/223, 241

(56) References Cited

U.S. PATENT DOCUMENTS

| | | | |
|---|---|---|---|
| 6,498,786 B1 * | 12/2002 | Kirkby et al. | 370/322 |
| 6,556,548 B1 * | 4/2003 | Kirkby et al. | 370/322 |
| 6,728,266 B1 * | 4/2004 | Sabry et al. | 370/468 |
| 6,804,196 B1 * | 10/2004 | Kadengal | 370/230 |

OTHER PUBLICATIONS

Song, Jie et al. "Pricing Based QoS Control Framework", Sep. 2000.*

X. Wang, H. Schulzrinne, "Performance Study of Congestion Price based Adaptive Service," Jun. 2000, In. Proc. International Workshop on Network and Operating System Support for Digital Audio and Video (NOSSDAV'00), pp. 1–10.*

Kirkby, "Traffic management and control using a single 'congestion price' like variable across multiple layers of network hierarchy," IEE, 1999, pp. 4/1–4/6.

Kirkby, "The use of economic and control theory analogies in the design of policy based Dynamic Resource Controlled (DRC) network architectures," ITC 16, 1999, pp. 447–456.

(Continued)

*Primary Examiner*—Seema S. Rao
*Assistant Examiner*—Kevin C. Harper
(74) *Attorney, Agent, or Firm*—Barnes & Thornburg

(57) ABSTRACT

A method of managing resources in a switched network including the steps of assigning a respective willingness to pay WtP value to each of a plurality of network users, assigning respective set point values for a network performance parameter for each of a plurality of routers in the network, assigning a respective initial price value to each router which is associated with the network performance parameter at the router, and operating a first control loop which is operable to receive respective measures of the actual network performance at each of the routers, calculate for each router, a plurality of difference values which are the respective differences between the actual performance and the set point for each router, adjust the price value for each router by a factor based on the respective difference value, generate a flow price value for each user by summing the price values for each of the routers in the path of the respective user's desired data flow through the network, allocate a resource share value for each user which represents the value of the respective VtP value divided by the respective flow price value, and cause the ingress router for each user to restrict flow into the network ingress from each user in accordance with each user's allocated resource share value, whereby the actual network performance at each router is made to converge to the set point value for the respective router by automatic admission control adjustment at the network ingress routers.

11 Claims, 10 Drawing Sheets

OTHER PUBLICATIONS

Low, "Optimization Flow Control with On-line Measurement." ITC 16, 1999, pp. 237-249.

Kelly, "Rate control for communication networks: shadow prices, proportional fairness and stability," 1997, 16 pages.

Radhakrishnan K, Measurement, Control and Charging Strategies for ATM Networks, thesis, University of Strathclyde, Sep. 1997, p. 43.

Bertsekas, "Data Networks," Second Edition, Prentice Hall, Section 6.5.

* cited by examiner

DYNAMIC RESOURCE CONTROL IN TELECOMMUNICATIONS NETWORKS

RELATED APPLICATION

This application is the non-provisional filing of provisional application Ser. No. 60/192,757 filed Mar. 28, 2000.

FIELD OF THE INVENTION

This invention relates to a method and apparatus for Dynamic Resource Control in a telecommunication network and a system incorporating the same.

BACKGROUND OF THE INVENTION

In all data networks, it is necessary to balance allocation of resources (such as bandwidth) amongst users. It is also desirable to be able to provide different levels of service to different users. This, in consequence, means that network resources must usually be shared unequally between users to provide different levels of service.

Once it is accepted that different users will receive different allocations of resources, it then becomes necessary to provide a mechanism which allows interaction between users. Such required interaction can make resource control systems computationally complex and also limit the ability of a network operator to introduce new resource control systems on a piecemeal basis.

The present invention sets out to produce a relatively simple mechanism for allocating resources to users in a network and a mechanism which is scaleable and does not need to be implemented on a network-wide basis.

SUMMARY OF THE INVENTION

In accordance with a first aspect of the invention there is provided a method of managing resources in a switched network comprising the steps of assigning a respective willingness to pay (WtP) values to each of a plurality of network users, assigning respective set point values for a network performance parameter for each of a plurality of routers in the network, assigning a respective initial price values to each router which is associated with the network performance parameter at the router, and operating a first control loop which is operable to receive respective measures of the actual network performance at each of the routers, calculate for each router, a plurality of difference values which are the respective differences between the actual performance and the set point for each router, adjust the price value for each router by a factor based on the respective difference value, generate a flow price value for each value for each user by summing the price values for each of the routers in the path of the respective user's desire data flow through the network, allocate a resource share values for each user which represents the value of the respective WtP value divided by the respective flow price value, and cause the ingress router for each to restrict flow into the network ingress from each user in accordance with each user's allocated resource share value, whereby the actual network performance at each router is made to converge to the set point value for the respective router by automatic admission control adjustments at the network ingress routers.

Preferably the method also includes assigning respective second set point values for a second network performance parameter for each of a plurality of routers in the network, assigning a respective initial second price value to each router which is associated with the second network performance parameter at the router, and further including operating a service managing operable to monitor the said convergence of the actual network performance with the set point network performance and to provide a provisioning potential value to a second control loop, the second control loop being operable to receive respective measures of the actual second network performance parameter at each of the routers, calculate for each router, a plurality of difference values which are the respective differences between the actual second network performance parameter and the second set point for each router, adjust the second price value for each router by a factor based on the respective difference value, generate a second flow price value for each user by summing the second price values for each of the routers in the path of the respective user's desired data flow through the network, and allocate a second resource share value for each user which represents the value of the respective provisioning potential value divided by the respective second flow price value, the ingress router for each user being caused to restrict flow into the network ingress from each user in accordance with each user's first and second allocated resource share values, whereby the actual network performance at each router is made to converge to the first and second set point values for the respective router by automatic admission control adjustments at the network ingress routers.

In this way, it is possible to separate the user network control loop from the operator network control loop. Thus in financial terms, the user network may be operated as a commodity market and the operator network may be operated as a facility market. For example, the user network control loop may operate to control QoS (such as jitter or delay), and the operator network control loop may operate to allocate bandwidth resource amongst users. As described below, these set points and the values of the willingness to pay and provisioning potential values may be set in accordance with policies which may in turn be related to service level agreements between users and network operators.

In a second aspect of the invention, there is provided admission control apparatus for a switched network having a plurality of routers, the apparatus arranged to record a predetermined respective WtP value for each of a plurality of network users, each of the users being coupled to the network via an ingress router, record respective predetermined set point values for a network performance parameter for each of a plurality of routers in the network, and to assign a respective initial price value to each router which is associated with the network performance parameter at the router, and the apparatus comprising loop control means operable to receive respective measures of actual network performance at each of the routers, calculate for each router, a plurality of differences values which are the respective differences between the actual performance and the predetermined set point for each router, adjust the price value for each router by a predetermined factor based on the respective difference value, generate a flow price value for each user of the network by summing the price values for each of the routers in the path of the respective user's desired data flow through the network, allocate a resource share value for each user which represents the value of the respective WtP value divided by the respective flow price value, and cause the Ingress router for each user to restrict flow into the network ingress from each user in accordance with each user's allocated resource share value, whereby the actual network performance at each router is made to converge to the set point value for the respective router by automatic admission control adjustments at the network ingress router.

In a further aspect, there is provided computer software which when executed, operates to manage resources in a switched network by performing the steps of assigning a respective WtP value to each of a plurality of network users, assigning respective set point values for a network performance parameter for each of a plurality of routers in the network, assigning a respective prive value to each router which is associated with the network performance parameter at the router, and operating a first control loop which is operable to receive respective measures of the actual network performance at each of the routers, calculate for each router, a plurality of difference values which are the respective differences between the actual performance and the set point for each router, adjust the price value for each router by a factor based on the respective difference value, generate a flow price value for each user by summing the price values for each of the routers in the path of the respective user's desired data flow through the network, allocate a resource share value for each user which represents the value of the respective WtP value divided by the respective flow price value, and cause the ingress router for each user to restrict flow into the network ingress from each user in accordance with each user's allocated resource share value, whereby the actual network performance at each router is made to converge to the set point value for the respective router by automatic admission control adjustments at the network ingress routers.

The invention also provides in another aspect, dynamic resource control network in which a network operator controlled entity, rather than the user itself, determines willingness to pay associated with user traffic, responsive to resource pricing information provided from traffic routing nodes in said network.

In another aspect, the invention provides a method of managing a dynamic resource control network wherein a network operator controlled entity, rather than the user itself, determines willingness to pay associated with user traffic, responsive to resource pricing information provided from traffic routing nodes in said network.

In an additional aspect, the invention provides software on a machine readable medium form managing a dynamic resource control network wherein a network operator controlled entity, rather than the user itself, determines willingness to pay associated with user traffic, responsive to resource pricing information provided from traffic routing nodes in said network.

It will be appreciated that the term "user" as used herein includes an aggregate of users.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

The following features can be observed when trying to devise parallels between a general control system mechanism and network operator/user-aggregate system;

There is a set point at which the system wishes to hold the output.

In general, a control system tries to hold the output level of the system at that specified set point.

The system achieves this by increasing or decreasing, for example, an intermediate variable in a feed back loop.

If there are multiple components sharing the output, all those components get treated in an even manner, in a general case.

In the network operator/user-aggregate scenario, this is equivalent to:

the operator wants to set a control level for each class of traffic such that isolation between classes are maintained.

The operator would wish that the control level kept is maintained, in other words the given supply is fully consumed.

The intermediate variable is manipulated according to the difference between the supply and how much it is consumed (in other words the demand). This variable is usually termed as the resource price. This resource price works as a forcing function that drives an economic system.

There are always multiple user-aggregates sharing the resource and an even treatment to all of them ensures a particular form of fairness known as proportional fairness.

Figure 1:
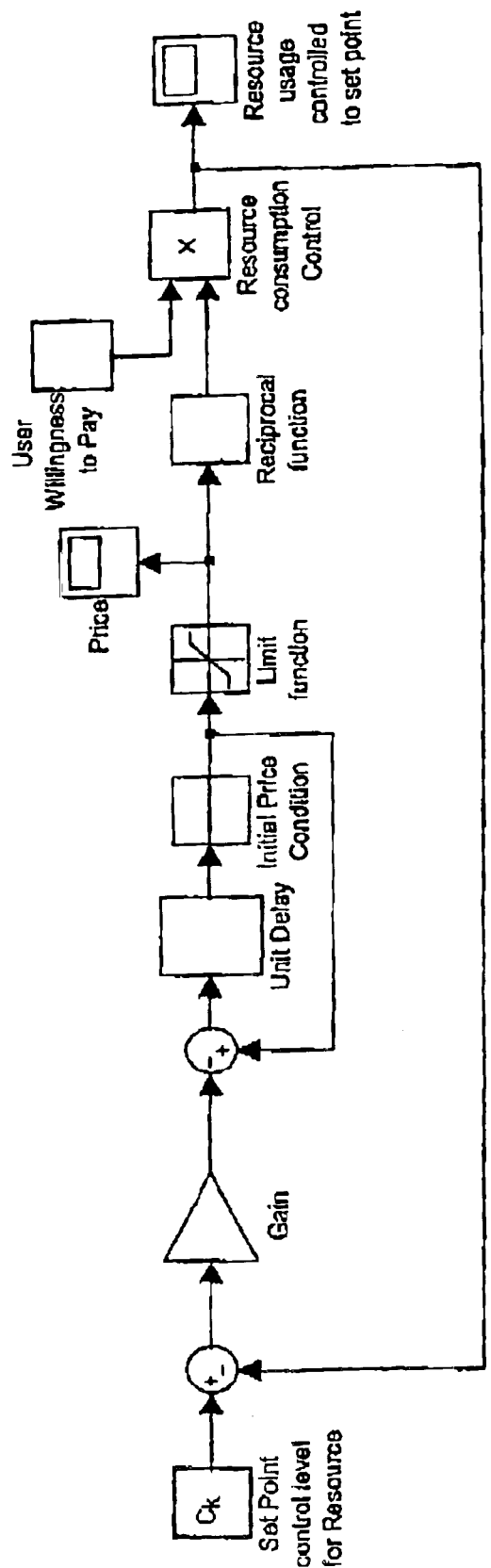
FIG. 1 shows a general schematic diagram of a resource control system in accordance with the present invention.

The general construction of the exemplary system is shown in FIG. 1. A more specific example with multiple resources and users will be described below. In FIG. 1, the parameters are defined as follows;

| | |
|---|---|
| $C_k$ | Set point for control, resource unit |
| $E_k$ | Difference variable |
| k | Sample step number |
| $K_k$ | Gain parameter |
| $P_k$ | Resource price, price unit for resource unit |
| $PP_k$ | Potential willingness to Pay by the user, Potential willingness to pay unit |
| $Y_k$ | Output level, resource unit |

(Notes: (1) $C_k$, $K_k$, $PP_k$ etc need not vary for sample step. (2) The resource price unit could be expressed as price unit per unit resource if the resource price is divided by the resource capacity. But then again this has to be rectified later in the ensuing calculations. Hence this is avoided.).

The difference between the set point and controlled output is given by $$E_k = C_k - Y_k$$

This difference is multiplied by a gain factor and fed to the resource pricing block. As the consumption of resource increases, the resource price must go higher and vice versa.

Hence this gain-difference product is given as a negative input to the pricing block. The resource price is later used as the denominator for calculating resource consumption. Here it works, for example, as the price to use a commonly facility (The numerator is the potential willingness to pay).

An initial resource price condition (P0) is forced on the system and is taken as unity. The resource price is also bounded to upper and lower limits so as to define an operating regime.

The output of the pricing block is given by $$P_{k+1} = P_k - K_k E_k$$

The output level Yk is now calculated as $$Y_{k+1} = PP_{k+1}/P_{k+1}$$

This is now fed back for sustained operation.

Multiple resources and user aggregates using different paths:

This is the usual scenario.

Let the total number of resources be RT and the total number of user aggregates be NT (active paths). Then the parameter of interest modifies to incorporate the different sets of resources, user aggregates and paths:

| | |
|---|---|
| $C_{Rk}$ | Set point for control for resource R |
| $E_{Rk}$ | Difference variable for resource R |
| $K_{Rk}$ | Gain parameter for resource R |
| $N_T$ | Number of user aggregates (active paths) |
| $P_{Nk}$ | Total resource price for user aggregate N |
| $P_{Rk}$ | Resource price for resource R |
| $R_T$ | Number of resources |
| $U_N$ | Resource consumption by user aggregate N (eg. Flow rate of active path) |
| $V_T$ | Number of paths (or combinations) |
| $PP_{Nk}$ | Potential willingness to Pay by the user aggregate N |
| $Y_{Rk}$ | Output level of resource R |
| $R_N$ | Resource subset used by user aggregate N |
| $N_R$ | User aggregate using resource subset R |

The equations become:

$$E_{Rk} = C_{Rk} - Y_{Rk}.$$

$$P_{Rk+1} = P_{Rk} - K_{Rk} E_{Rk}$$

If there are $N_T$ user aggregates using these resources in $V_T$ paths the resource price for each user aggregate is calculated as:

$$P_{Nk+1} = \Sigma P_{Rk+1}, R \in R_N$$

The resource consumed by user aggregate N is given by:

$$U_{Nk+1} = PP_{Nk+1}/P_{Nk+1}$$

The output level is now given as:

$$Y_{Rk+1} = \Sigma U_{Nk+1}, N \in N_R$$

This summation is an automatic result of resource consumption by different users. This value is now fed back for sustained operation.

Scalability: This suggests that the system above is scalable to multiple layers of hierarchies.

Multiple users contributing to a user aggregate:

This subsection is included for completeness.

| | |
|---|---|
| $N_T$ | Total number of user aggregates |
| $P_{Nk}$ | Total resource price for user aggregate N |
| $U_N$ | Resource consumption by user aggregate N |
| $V_T$ | Total number of paths |
| $PP_{Nk}$ | Potential willingness to Pay by the user aggregate N |
| n | Number of users making N user aggregates |
| $P_{nk}$ | Price for individual user making up total aggregate resource price PNk |
| $u_n$ | User resource consumption making up aggregate consumption UN |
| v | Number of individual paths making V aggregate paths |
| $PP_{nk}$ | Potential willingness to Pay by user making up aggregate PPNk |

$N \in n$
$P_{Nk} = \Sigma P_{nk}$
$U_N \in u_n$
$V \in v$
$PP_{Nk} = \Sigma PP_{nk}$ The operation at this level is mainly decided by the business policy. It may be defined by how individual SLAs are made, how the utilities are assessed and distributed and/or how the individuals are charged.

Phd Nkand $PP_{Nk}$ are parameters in the carrier network level for user aggregates. How these are distributed and mapped to the real world customer relations/economics is a subject matter not dealt in this paper. It could be a linear or non-linear relationship as decided by various policies.

An implementation of the principles outlined has been performed on a real network. This user a cluster of Linux routers and a set of distributed flows. The model for demonstration uses three ingress routers, two core routers and four traffic sources for generating flows and for introducing disturbances to the network. The model uses a distributed three flows scheme.

This model is sufficient to demonstrate the principles and allows the study of interactions between the three component flows.

The lab model for implementation was devised to be compliant with the COPS (Common Open Policy Server) Resource Broker model as shown:

The user policies to be implemented are stored in the Policy Information Base (PIB). The implementation decisions are made at the Policy Decision Point (PDP). These policies are then enforced at the Policy Enforcement Points (PEP). The network topology and measurement information is stored and collected at the Network Information Base (NIB). The benefit to user and revenue to network operator are displayed at the Benefit/Revenue Meter (BRM).

Figure 4:
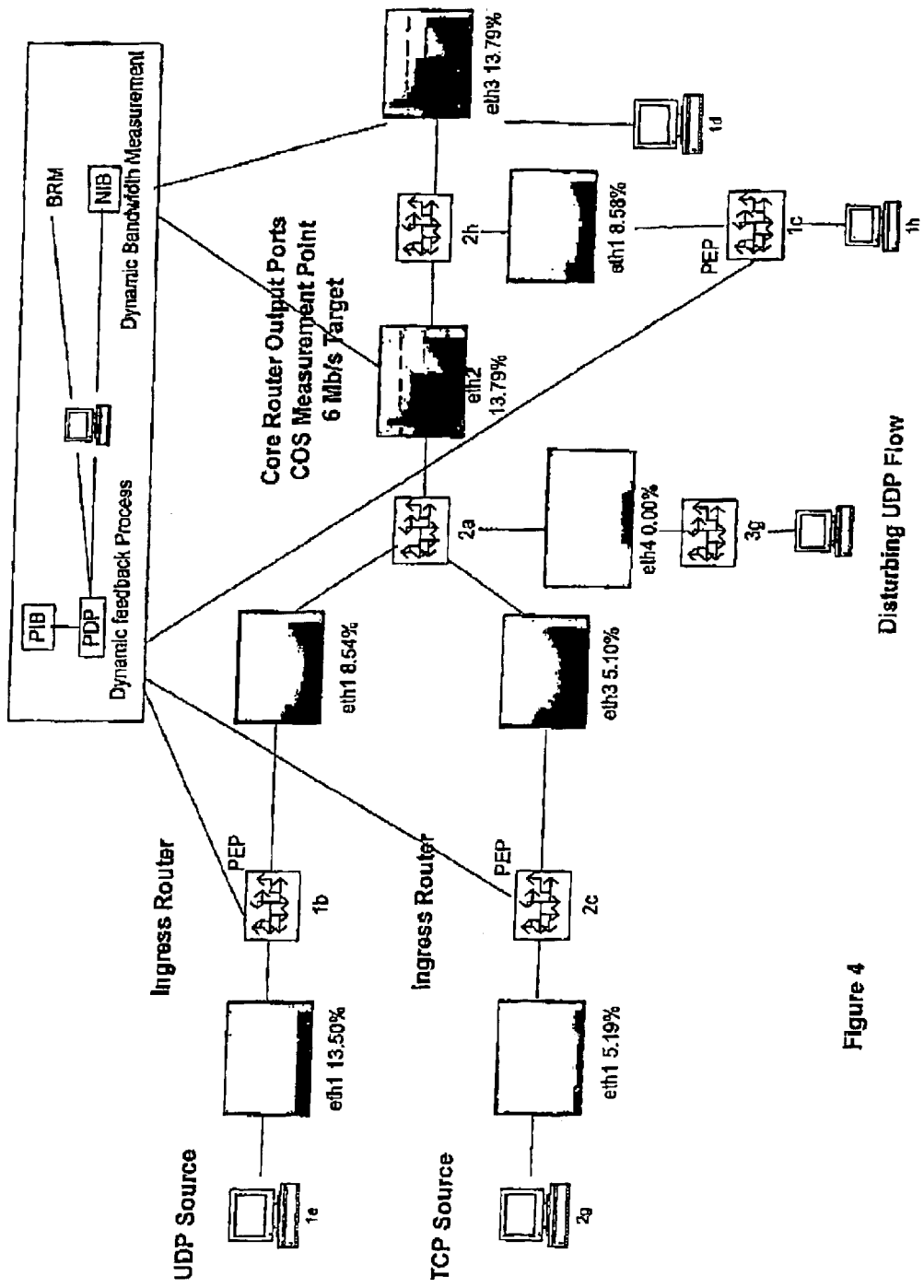
FIG. 4 shows a screen capture of a demonstration network of FIG. 4.

For ease of demonstration and measurement and diagnostic purposes the model was drawn up in the Tkined and appropriate ports were monitored using SNMP monitors. A screen capture of the working system is shown in FIG. 4.

The network is designed around a set of Linux routers and traffic sources and sinks.

Routers designated 1b, 2c and 1c serve as the ingress routers. The output bandwidth of these routers are to be controlled to facilitate ingress control per class of traffic. For this purpose, the diffserv CBQ is attached to their output ports. The command to control the bandwidth is given through the traffic controls (tc) Interface of Linux.

Routers 2a and 2h form the core network. These are the system resources. The output bandwidth (resource utilisation) of these routers is set at a specified level (in this case 6 Mbps). The output bandwidth of these routers is to be measured. To achieve this per class of traffic, the diffserv CBQ is attached to their output ports as well. The measurement is done through the tc command interface. The statistics command provide the measurement.

Flow1: Host 1e provides a UDP traffic source that users core router 2a only. The output is sunk at the input port of 2h. The ingress controller is 1b.

Flow2: Host 2g provides a TCP traffic that uses both resources 2a and 2h. The sink is 1d. The ingress controller is 2c.

Flow3: Host 1h provides a UDP source that uses resource 2h only. The sink is 1d again. The ingress controller is 1c.

Disturbance: Host 3g is used to generate a traffic pulse so as to create an overflow at the core routers, to study the performance and demonstrate the effect. Two flows are generated: D1, that uses both resources and terminates at 1d and D2 that uses only one resource (2a) and terminates at 2h.

The communication interface is at the moment done through sah (secured shell) access and is planned to be done via remote invocations in the future.

Advantageously the software is implemented in a Python platform, primarily for rapid prototyping.

Only one class of traffic is used in the present demonstration. However, it, will be understood that the system could be used for any class of traffic.

As described earlier, there are three user (aggregate) flows taking three routers, User1 shares resource1, user2 shares both resource1 and resource2 and user3 shares resource2.

At start up the system allocates the bandwidth for these user aggregates using an initial price. This decision is made at the PDP using the algorithm. The bandwidth at the resource outputs are now sensed and fed back. This information is collected at the Network Information Base. The algorithm then modifies the allocated bandwidth so as to force optimum utilisation. This is achieved by varying the intermediate variable that is the resource price. The steady state is reached in two sample steps. In the current implementation the time step is about one second.

The graphs on the screen capture shown above (FIG. 4) shows the network load measured via SNMP daemons. The scales have been modified to give better visibility and represent about 50 seconds on the x-axis.

The graph on the left-hand-top (S1) shows the UDP traffic generated. The second graph on the same line (l1) shows the controlled output. The dip in the flow is due to the effect of the disturbance that increases the resource usage suddenly. The disturbance flow can be seen in the lower middle (D1). It may be observed that the excess UDP flow gets dropped at the Ingress router. A mechanism may be employed to signal packet drops back to the user for the user to take corrective measures, Increasing user Potential willingness to pay.

The lower left-hand graph (S2) shows the TCP flow that is input to the system. The second graph on the line (l2) shows the controlled flow. It is interesting to note that the TCP flow varies itself at the source, since the TCP works underneath the control provided by the system. This can be called TCP trunking and may find great commercial applications because the network operator can provide preferential treatment to specific edge-differentiated TCP user flow aggregates. In addition, in a heterogenous network, TCP delays in the core are not uncommon. As the control is performed at the Ingress, these delays are avoided. This basically suggests that TCP performance can greatly be improved if the control system proposed is overlayed.

The lower graph on the right-hand side (l3) shows another controlled UDP flow that is input to the system.

The two graphs on the top right-hand side (C1 & C2) shows the outputs of the core routers. The sudden rise is due to the disturbance pulse. The bandwidth can be seen to be controlled back to the set point very fast. The time delays are due to the various time lags in the network and system implementation which at the moment are not attended to.

It can be seen that the disturbance affects all the ingress controllers. This is because the disturbance flow passes through both resources. If only one resource is disturbed, only the respective resources will be affected. This will reiterate the fact that the calculation is not depending on global knowledge. A screen capture of this is not included, to save space. (This scenario is better understood in the analysis part where one can see interactions between various components. This is explained in the simulation section).

An exact model of the demonstration system described above is given above. The various constituent blocks are explained earlier in the general model.

There are two resources with two settable control levels and three users and flows taking three routes.

The ingress controller determines the resource prices per user-aggregate path. The controlled flows get combined in the core routers. As a consequence the system is inherently distributable and scalable.

Figure 6:
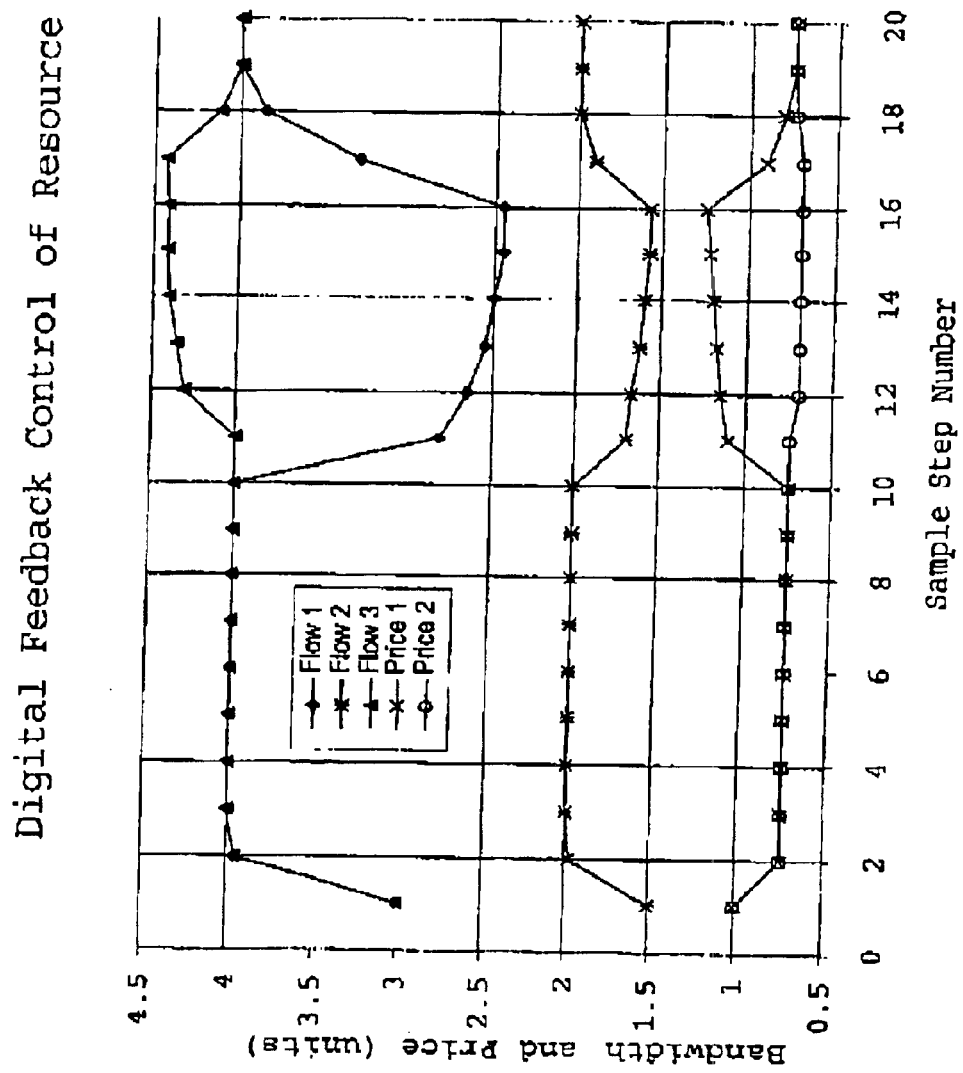
FIG. 6 shows a graphical representation of simulation results for the network of FIG. 4.

Simulation:

Results of a matlab simulation are shown in FIG. 6.

Figure 2:
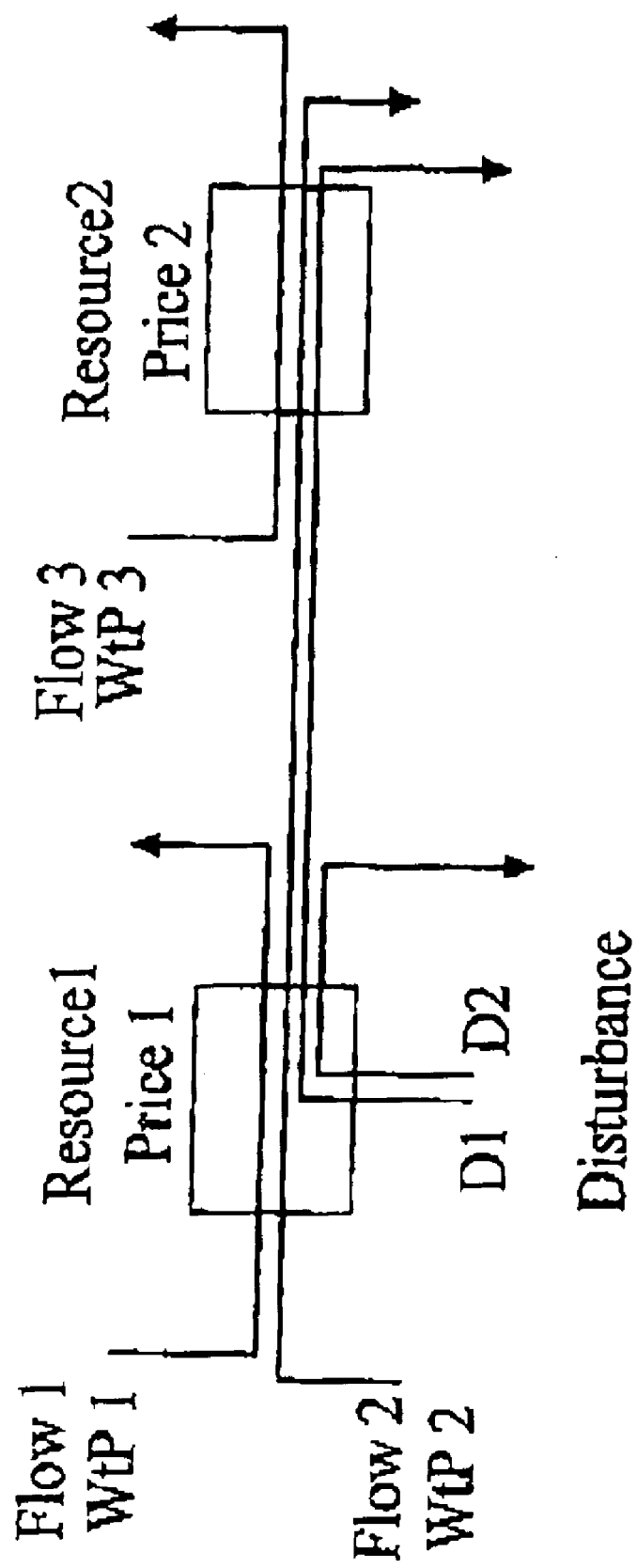
FIG. 2 shows an example of resource utilisation in accordance with the present invention.
Figure 3:
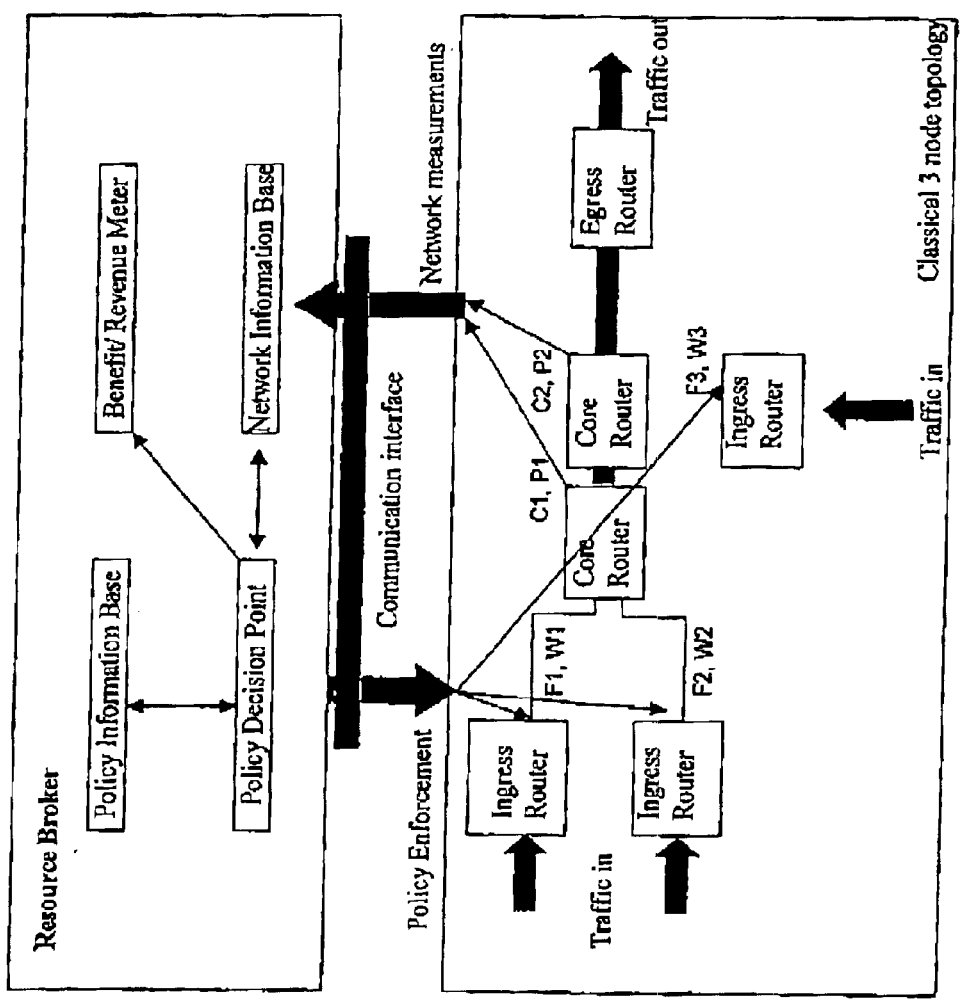
FIG. 3 shows a schematic diagram of a system in accordance with the present invention.

(Plots Flow1, Flow2 & Flow 3 corresponds to plots l1, l2 & l3 of the screen captures (FIG. 4). The disturbance flow used i D2, not D1 (ref: FIG. 2)))

Explanation:

Step1: At step 1 the program starts up.

The initial price is unity and PP for all users is set at 3 units per unit bandwidth.

From given equations:

The resource price for each user is $$PN1[1]=PR1[1]=1$$

$$PN2[1]=PR1[1]+PR2[1]=2$$

$$PN3[1]=PR2[1]=1$$

The flow allocated to each user is $$UN1[1]=PPN1[1]/PN1[1]=3$$

$$UN2[1]=PPN2[1]/PN2[1]=1.5$$

$$UN3[1]=PPN3[1]/PN3[1]=3$$

The total output at the resources is $$YR1[1]=UN1[1]+UN2[1]=4.5$$

$$YR2[1]=UN2[1]+UN3[1]=4.5$$

Step2: The above usage information is now fed back to the controller.

The error signals are $$ER1[1]=CR1[1]-YR1[1]=1.5$$

$$ER2[1]=CR2[1]-YR2[1]=1.5$$

The system now updates the resource prices as $$PR1[2]=PR1[1]-KR1[1]ER1[1]=0.76, KR1=0.16$$

$$PR2[2]=PR2[1]-KR22[1]ER2[1]=0.76, KR2=0.16$$

The resource prices for individual users is $PN1[2]=PR1[1]=0.76$ $PN2[2]=PR1[2]+PR2[2]=1.52$ $PN3[2]=PR2[2]=0.76$ The flow allocated to each user is $UN1[2]=PPN1[2]/PN1[2]=4$ $UN2[2]=PPN2[2]2/PN2[2]=2$ $UN3[2]=PPN3[2]/PN3[2]=4$ The total output at the resources is $YR1[2]=UN1[2]+UN2[2]=6$ $YR2[2]=UN2[2]+UN3[2]=6$ Features of importance:

When the system senses that the demand is less than supply, the price is reduced so that the resources are fully utilised.

Comparing the utilisation of the network between step1 and step2

$YR1[1]=4.5$ units $YR2[1]=4.5$ units $YR1[2]=6$ units $YR2[2]=6$ units

There is 33% increase in the usage (here flow).

Thus the network gets its set control capacity fully utilised.

For any resource, for a given sum of PPs, the product of total resource usage and resource price remains same in both step1 and step 2 and equals the sum of PPs for that resource.

$YR1[1]+PR1]1]=4.5=PPN1[1]+PPN2[1]/2$ $YR1[1]+PR1[2]=4.5=PPN1[2]+PPN2[2]/2$

Comparing the total resource revenue of the network for resource usage between step1 and step2

Total Resource Price$R1R2[1]=PN1[1]+PN2[1]+PN3[1]=4$ units

Total Resource Price$R1R2[2]=PN1[2]+PN2[2]+PN3[2]=3$ units

In total the resources fetches one unit less because there was spare capacity supply. 3. Operator revenue:

Due to the resource price adjustment mechanism that invites more traffic, the total resource price of the network reduces, while the operator is able to input more traffic into the network.

Extra traffic permitted to input at no extra cost

Extra traffic allowed at resource$R1=YR1[2]-YR1[1]=1.5$ units

Extra traffic allowed at resource$R2=YR2[2]-YR2[1]=1.5$ units

If the user is paying a real price per unit share of resource (unit bandwidth in this case), the extra revenue to the operator from the user can be calculated as follows. CP here means the real charged price. (For convenience of calculation, CP is taken as the PP of individual users and remains same at both step1 and step2).

Extra revenue from user=$(CPN1[2]*UN1[2]+CPN2[2*UN2[2]+CPN3[2]*UN2[2])$ $(CPN1[1]*UN1[1]+CPN2[1]*UN2[1]+CPN3[1]*UN3[1])$ =30 units−22.5 units=7.5 units This revenue can then be utilisied by the operator for his benefit/passing on to individual users according to business strategy etc.

4. Fairness to user traffic flow:

It may be noted that each user traffic flow pays the same resource price per resource consumed:

Resource price/resource for user$N1[2]=PPN1[2]/UN1[2]=0.75$

Resource price/resource for user$N2[2]=(PPN2[2]/2)/UN2[2]=0.75$

Resource price/resource for user$N3[2]=PPN3[2]/UN3[2]=0.75$

The property observed at step2 suggests that the distribution is proportionally fair. Users of each resource pay equal resource price per resource use1.

It will be noted that at step 10, a disturbance of two units is introduced to resource R1 (disturbance signal is not plotted). The resource price of R1 can be seen going high immediately. Flow1 and Flow2 reduces in a proportional manner so as to maintain the total load at the set point. In other words, when the demand is more than supply, the price is increased to force less usage.

As a consequence of reduction in Flow2, the resource price of R2 goes down and lets in more traffic from Flow3. In other words, when the supply is more than the demand, the price is reduced so as to force more usage.

The interactions can be clearly seen in the graph.

The pricing function also drives flow levels to a proportionally fair distribution.

After a while the disturbance is removed and the resource prices and hence the flows regain the previous values.

The gain factor determines the convergence. It is found that at low levels (say below 0.16) it is not very sensitive to oscillations and is sufficiently stable.

The system described above can be used to provide efficient use of available network bandwidth, congestion control, providing class isolation and for increasing revenue.

Advantages to Carrier Network Operator:

A priori global knowledge of other user traffic or Potential willingness to pay is not required.

Can be used in any system where each aggregate path (using a given set of resources) operates as a virtual port. (Knowledge of resources used is usually available through OSPF, MPLS-LSPs, optical wavelengths etc.)

Ubiquitous deployment of the proposed protocol is not required for system operation. This is obvious from the demonstration experiment. This facilitates incremental deployment.

Available resource price information can directly use used

Can assure isolation among classes by keeping the allocated bandwidth

Can readily integrate to charging systems

Tries to fill up network bandwidth to the allocated control level of the class of traffic This increases the revenue to the operator Off-line models working on databases can be used as a management tool for impact analysis etc.

These advantages can be readily examined from the numerical examples given earlier.

Network utilisation is maximised

Transport layer protocols (TCP, UDP etc) operate underneath the control provided TCP gets controlled at the ingress itself than at the core, thus enhancing the performance Users are treated in a proportional fair manner A further advantage of the arrangement is that the method may be implemented incrementally over a network to employ the controls described above for the system as a whole to operate effectively. However, the specific benefits of the present invention will have localised effect where it is not applied to the whole network. Greatest overall benefit is to be obtained when the method is applied throughout the network.

Any range or device value given herein may be extended or altered without losing the effect sought, as will be apparent to the skilled person for an understanding of the teachings herein.

Figure 7B:
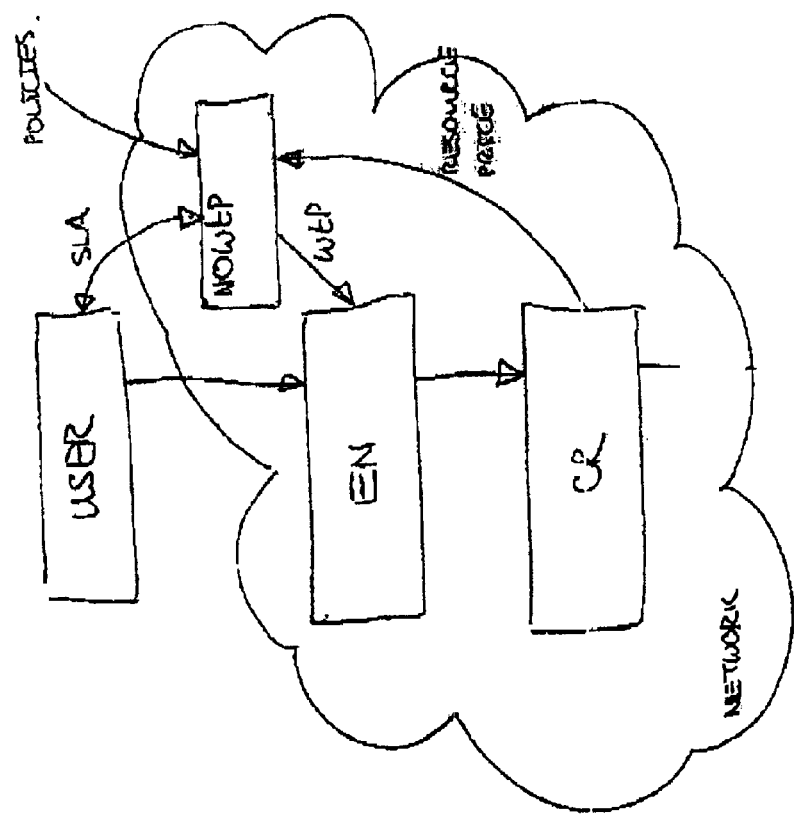
FIGS. 7(a–b) shows a graphical representation of a system in accordance with the present invention.
Figure 7A:
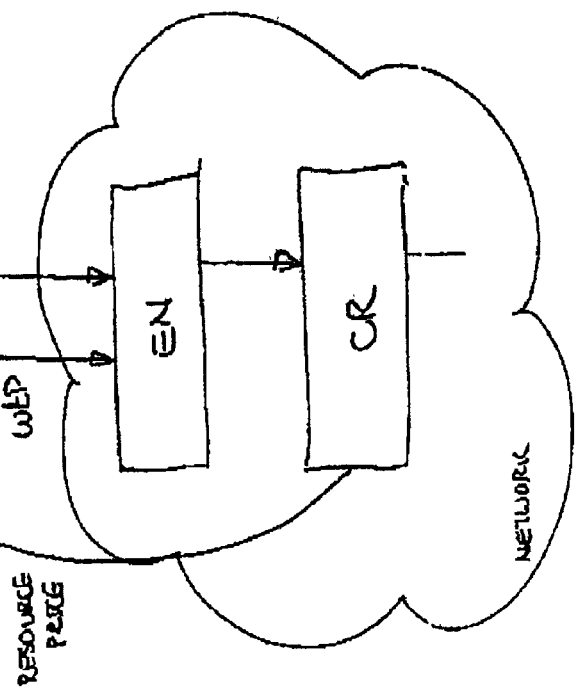

Referring now to FIG. 7(a) there is shown a dynamic resource control system comprising a user (network) providing traffic into a network comprising edge node and core routers. The user also provides a Willingness to Pay (WtP) parameter to the network, which is used in admission control and/or bandwidth allocation in the edge node. Feedback regarding resource pricing in the network and intended to influence adjustment of the WtP parameter is provided from the network (whether edge node or core routers) back to the originating user/user network which controls adjustment of the WtP parameter.

In contrast in the arrangement of FIG. 7(b) there is shown a second arrangement in which, instead of feeding back resource pricing information to the user initiating the traffic, the feedback is provided to a Network Operator unit (NOWtF') which adjusts the WtP associated with the user's traffic. The user has no direct control over the wtp parameter fed to the edge nodes. Instead, the WtP parameter fed to the edge node is provided responsive to a service level agreement between the user and the network operator, together with any policies which the network operator applies in translating SLA's to WtP parameters.

Figure 8:
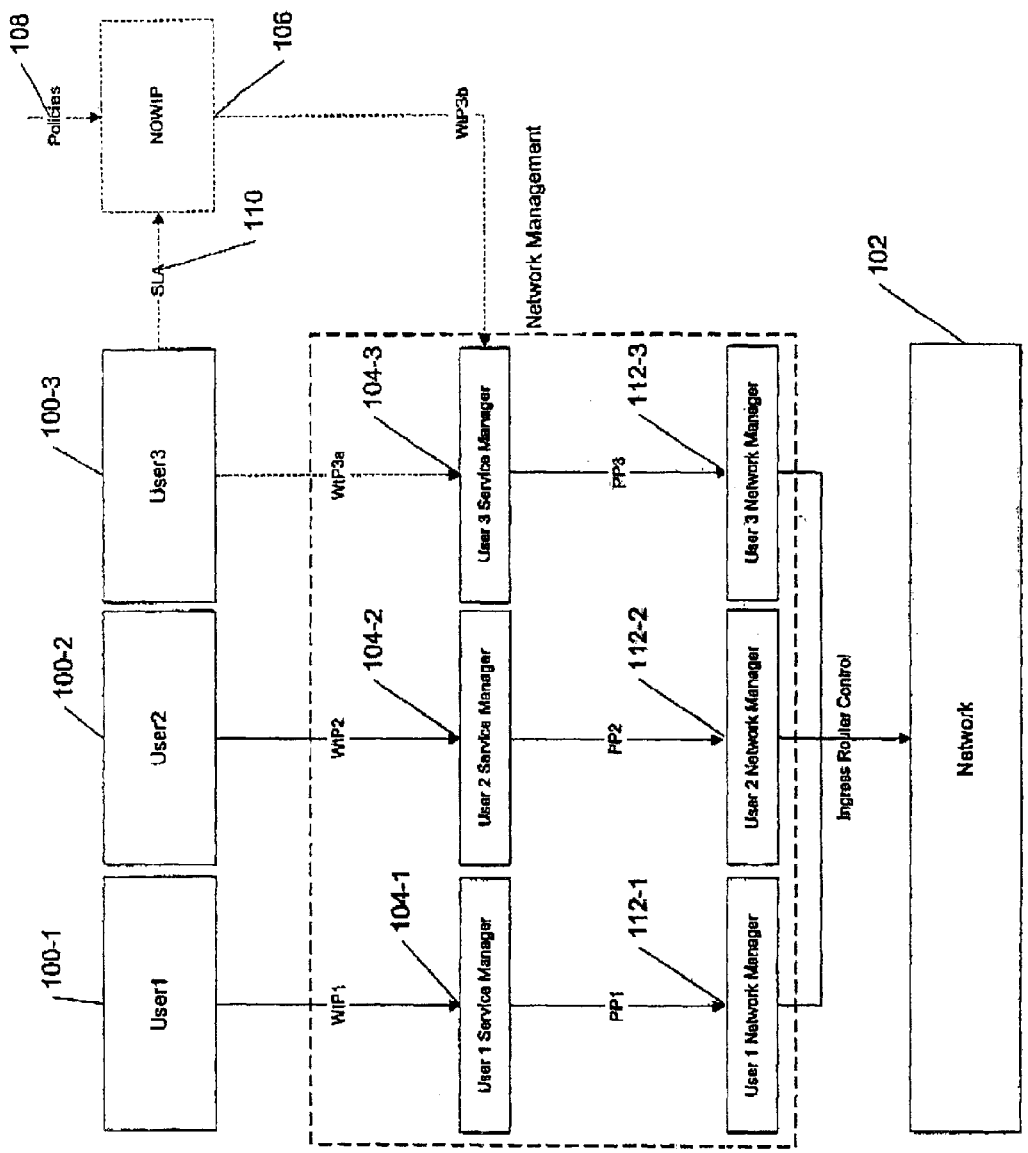
FIG. 8 is a schematic block diagram of a network having three users and in which resource controls is controlled by two control loops.

FIG. 8 shows a development of this idea. Three users 100-1, 100-2, 100-2, 100-3 have data to send into a network 102.

Each user has an associated willingness to pay parameter WtP1, WtP2 and WtP3. The willingness to pay parameter is stored in respective service manager 104-1, 104-2, 104-3.

As described above, the WtP may be agreed directly with the user or may be calculated by a network operator WtP calculator 106 which may have policies 108 and/or service level agreements 110 as inputs. Taking these inputs, the network operator WtP calculator 106 is able to generate a willingness to pay value WtP3b for user 3.

Figure 5:
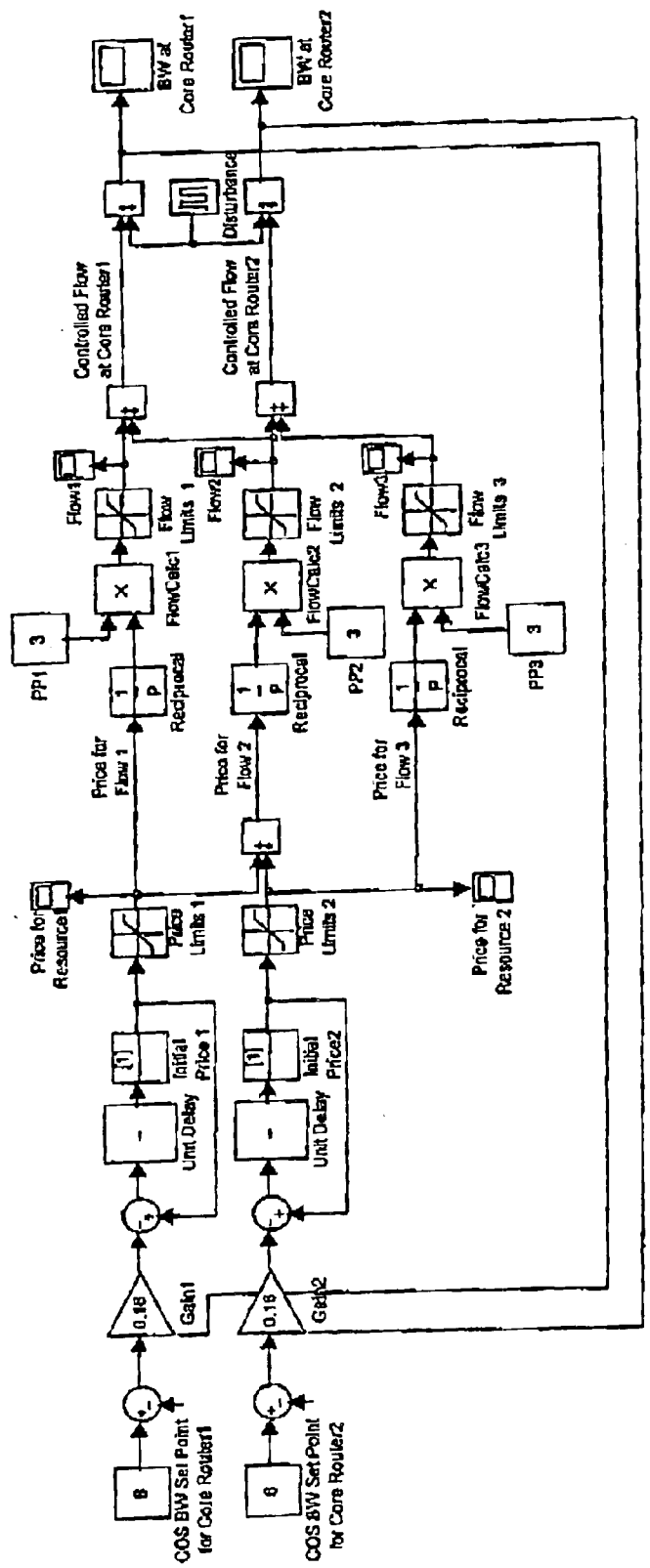
FIG. 5 shows a more detailed nodes of the network of FIG. 4.

The WtpP parameter is used in conjunction with the price output of the control loops described above (for example in connection with FIG. 5) in order to adjust the volume of data accepted from each user using ingress (or edge router) control. Typically, this control loop would be concerned with monitoring QoS parameters of the network.

In this embodiment, a second control loop is concerned with monitoring network resources such as bandwidth allocation. It will be appreciated that a heavily loaded network (in terms of bandwidth) is less likely to provide good QoS and therefore there is some inter-relationship between bandwidth allocation and QoS. This inter-relationship is managed by the service managers 104-1, 104-2, 104-3 which are able to control resource allocation by adjusting a provisioning parameter PP1, PP2, PP3 which is used as the "willingness to pay" input for the second (network) control loop. The provisioning parameters are received by network managers 112-1, 112-2, 112-3 which are each associated with a particular user and service manager.

With reference to FIG. 9, the service control loops and network control loops described above are similar in structure to the loop described above in connection with FIG. 1.

Figure 9A:
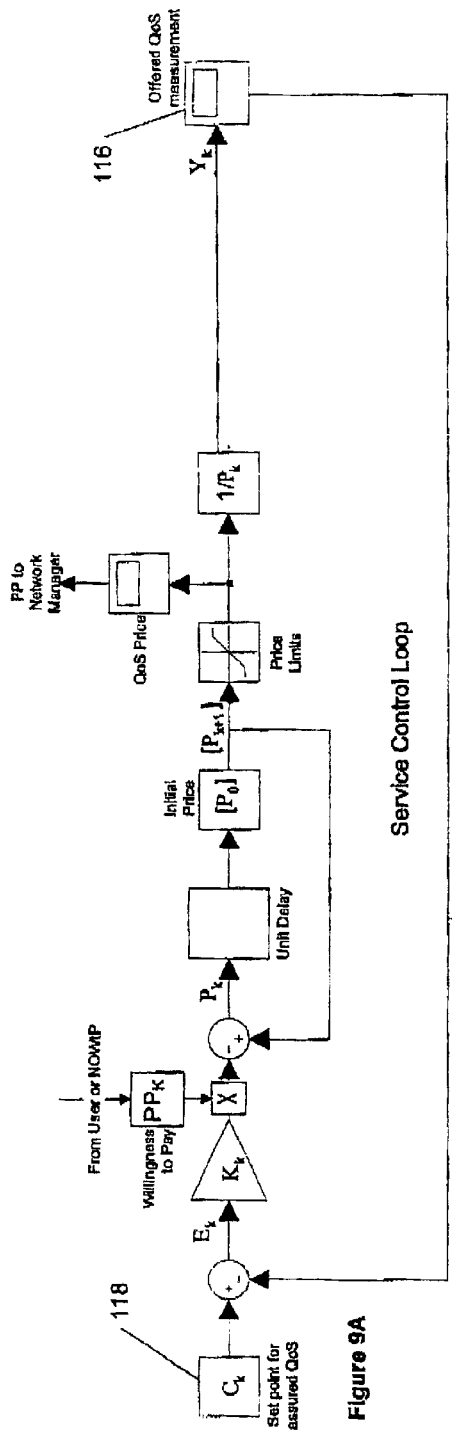
FIG. 9 is a schematic block diagram of the control loops of FIG. 8.
Figure 9B:
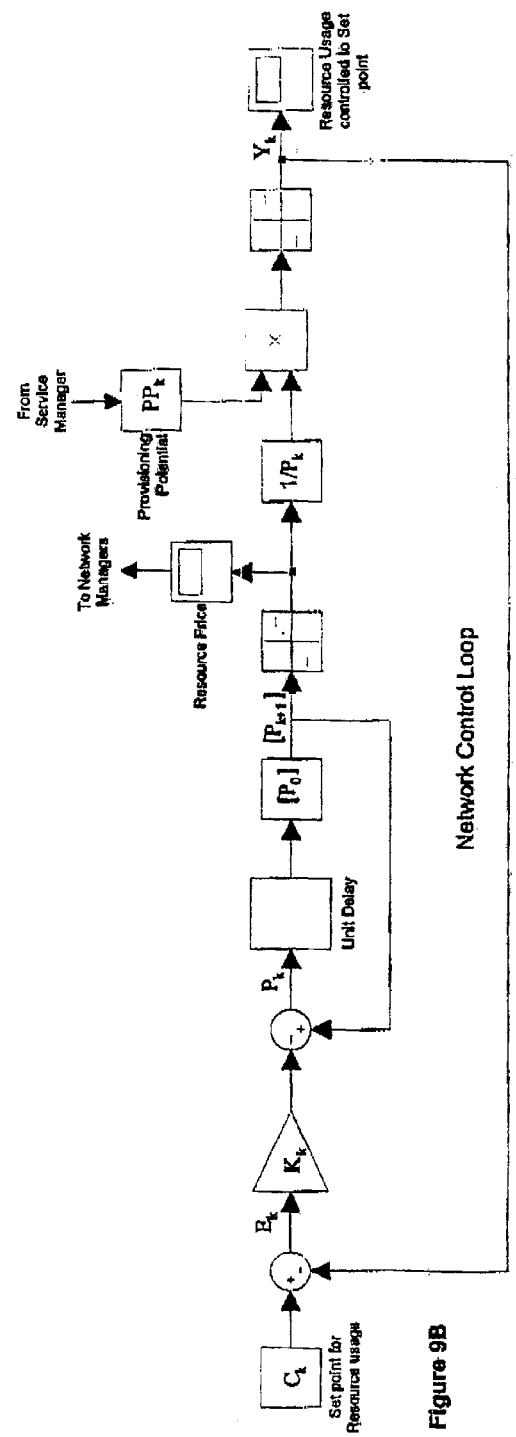

With particular reference to FIG. 9a, it will be seen that the QoS price output of the QoS control loop is fed to the service manager. One such control loop is provided for each QoS parameter which is to be controlled to a set point. Thus, a particular user (with reference to FIG. 10) such as user 2, who wishes to have a service which provides a particular level of QoS parameter 1 and QoS parameter 2, has the QoS prices summed (in summer 114). This is analogous to the bandwidth control loop described above in which a user wishing to use a plurality of routes between a plurality of paths between routers has the price for each path summed. Thus, a user wishing to have high QoS or control over a large number of QoS parameters will require a higher WtP value to obtain similar levels of each of those QoS relative to a user which is only concerned with a small number of QoS parameters.

Each user service manager 104-1, 104-2, 104-3 operates to dynamically adjust the provisioning potential values so that the balance between bandwidth allocation and QoS can be met. By increasing the provisioning potential values fed into the network control loop, the network control loop is caused to allocate more bandwidth to that user thereby facilitating an improvement in QoS.

For example, if it is found that the convergence of the actual measured QoS 116 (FIG. 9a) with the set point Qos 118 is very poor, then one option for the service managers is to increase the provisioning potential value so that a particular user receives a larger allocation of bandwidth which in turn is likely to allow the QoS measured at each router to converge to the set point QoS. Thus, the service managers and network managers periodically negotiate via the provisioning potential parameter in order to ensure a sensible balance between bandwidth allocation and QoS.

Figure 10:
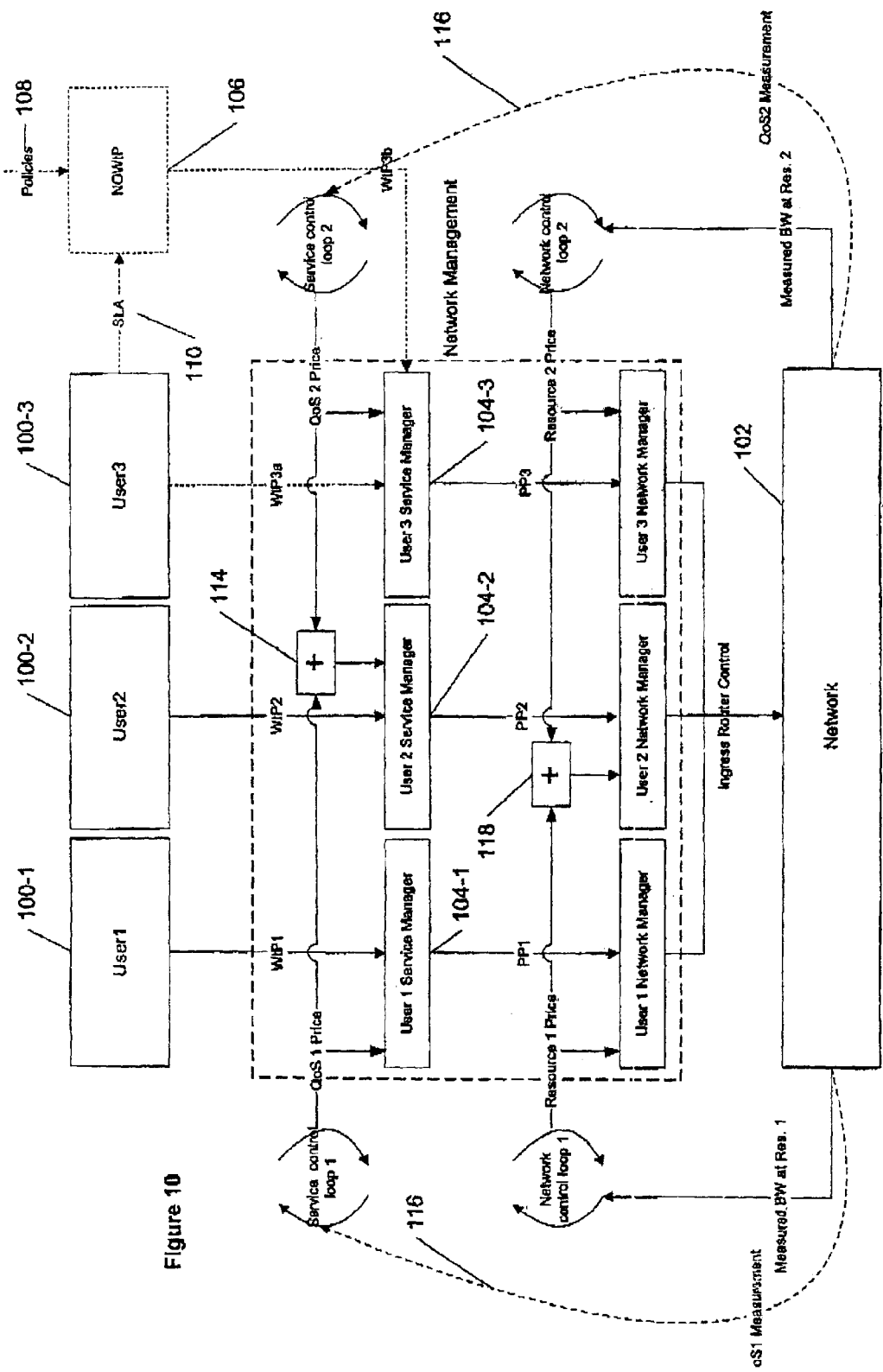
FIG. 10 is a schematic block diagram of the network of FIG. 8 including the control loops.

Considering FIG. 10 in detail, as discussed above, user 2 has reached an agreement which covers a requirement for particular levels performance in terms of QoS parameter 1 and QoS parameter 2. Thus the prices are summed in summer 114 before being fed into user 2 service manager 104-2. The other users 100-1 and 100-3 have less complicated service level agreements which mean that they are only interested in QoS parameter 1 and QoS parameter 2 respectively. Thus each of their respective service managers is concerned only with the QoS price output from the loop of FIG. 9a for each of the respective QoS parameters.

In this example, user 2 is also wishing to send data over the network which uses a path which requires the resources which are monitored by resource control loop 1 and control loop 2. Thus as discussed above in connection with FIG. 5, the price for the two resources is summed in summer 118 which is then used to provide an allocated resource share value by comparing the summed price with the provisioning potential. Users 1 and 3 have data which flows only over a path using resource 1 and resource 2 respectively. Thus their user network managers 112-1 and 112-3 are concerned only with the price output from the resource control loop (FIG. 9b) for their respective resources.

It will be appreciated that the embodiment shown in FIG. 10 is a very simple exemplary embodiment since it is concerned only with two possible QoS parameters, three users and only two network routers. In practice, this structure would be very much more complicated with many more users, resources and QoS measurements. It will also be appreciated that a user may for example operate only in the upper plane of the diagram having access to a QoS control loop but need not be concerned with the lower plane of the diagram in which resources are controlled using the type of control shown in FIG. 1.

Similarly, a user may be concerned only with the resource (network) control loops (in which case their respective network managers would receive willingness to pay values in place of provisioning potential values) without being concerned at all with the QoS control loop. Thus a "mix and match" approach may be taken to implementation of this technique.

Clearly, the full advantage of the technique will be obtained when the whole network has all users being provided with QoS and resource control loop operation. The "mix and match" approach is possible because it is not necessary to have detailed information about other users. Interaction between users occurs only via a price value. The price value itself is calculated by measurements at the router. Thus users may pass data through a router without having any interaction with the dynamic resource control technique of this invention. In this case what happens is that this type of user degrades QoS and user resources which this technique cannot control. However this degradation and use of resources is reflected by the direct measurements carried out in the control loops and is in turn reflected by a higher price for that QoS parameter or bandwidth allocation.

Thus it will be seen that the technique above provides a computionally simple and readily scaleable technique for providing particular QoS and also for balancing bandwidth and fine control may therefore be had over QoS offered to users.

This technique is applicable to any data network transport protocol, for example, UDP or TCP/IP. It is also applicable to optical networks since it will be appreciated that if the resource control loop is operated very strictly to prevent network overload, buffering within the network is not required. This is a consequence both of the fine control over network utilisation and of the fact that control occurs at the Ingress.

What is claimed is:

1. A method of managing resources in a switched network having a measurable actual network performance and a plurality of network users each having a respective desired data flow through the network from a respective network ingress at a respective ingress router, the method comprising the steps of:
   (a) assigning a respective willingness to pay (WtP) value to each of a plurality of network users,
   (b) assigning respective set point values for a network performance parameter for each of a plurality of routers in the network,
   (c) assigning a respective initial price value to each router which is associated with the network performance parameter at the router, and
   (d) operating a first control loop which is operable to:
      (i) receive respective measures of the actual network performance at each of the routers,
      (ii) calculate for each router, a plurality of difference values which are the respective difference between the actual performance network and the set point for each router,
      (iii) adjust the price value for each router by a factor based on the respective difference value,
      (iv) generate a flow price value for each network user by combining the price values for each of the routers in the path of the respective user's desired data flow through the network,
      (v) allocate a resource share value for each network user which represents the value of the respective WtP value taking account of the respective flow price value, and
      (vi) cause the ingress router for each user to restrict flow into the network ingress from each user in accordance with each user's allocated resource share value,
   whereby the actual network performance at each router is made to converge to the set point value for the respective router by automatic admission control adjustments at the network ingress routers.

2. A method according to claim 1, wherein the WtP value for each user is associated with user bandwidth requirements, the price values are associated with bandwidth usage at each router and wherein the first control loop is operable to receive measures of bandwidth usage at each router.

3. A method according to claim 1, wherein the WtP value for each user is associated with user QoS requirements, the set point are associated with QoS parameters at each router, the price values are associated with QoS at each router and wherein the first control loop is operable to receive measures of QoS at each router.

4. A method according to claim 1, wherein the network has a measurable second actual network performance parameter, the method including assigning respective second set point values for a second network performance parameter for each of a plurality of routers in the network, assigning a respective initial second price value to each router which is associated with the second network performance parameter at the router, and further including operating a service manager operable to monitor the said convergence of the actual network performance with the set point network performance and to provide a provisioning potential value to a second control loop, the second control loop being operable to
   (a) receive respective measures of the actual second network performance parameter at each of the routers,
   (b) calculate for each router, a plurality of difference values which are the respective differences between the actual second network performance parameter and the second set point for each router,
   (c) adjust the second price value for each router by a factor based on the respective difference value,
   (d) generate a second flow price value for each user by summing the second price values for each of the routers in the path of the respective user's desired data flow through the network, and
   (e) allocate a second resource share value for each user which represents the value of the respective provisioning potential value divided by the respective second flow price value,
   the ingress router for each user being cause to restrict flow into the network ingress from each user in accordance with each user's first and second allocated resource share values, whereby the actual network performance at each router is made to converge to the first and second set point values for the respective router by automatic admission control adjustments at the network ingress routers.

5. A method according to claim 4, wherein the WtP value for each user is associated with user QoS requirements, the set point value is associated with QoS at each router, the price values are associated with QoS at each router and wherein the first control loop is operable to receive measures of QoS at each router.

6. A method according to claim 4 or 5, wherein the provisioning potential value for each user is associated with user bandwidth requirements, the second set point values are associated with bandwidth usage at each router, the second price values are associated with bandwidth usage at each router and wherein the second control loop is operable to receive measures of bandwidth usage at each router.

7. A method according to claim 1, wherein the price value is adjusted in the control loop by a factor which is the product of the difference value and a number in the range 0.1 to 0.2.

8. A method according to claim 4, wherein the price value is adjusted in the control loop by a factor which is the product of the difference value and 0.16.

9. Admission control apparatus for a switched network arranged to have a plurality of users each having a respective desired data flow through the network from a respective network ingress at a respective ingress router, having a plurality of routers and a measurable actual network performance, the apparatus being arranged to:
  (a) record a predetermined respective WtP value for each of a plurality of network users, each of the users being coupled to the network via an ingress router,
  (b) record respective predetermined set point values for a network performance parameter for each of a plurality of routers in the network, and
  (c) to assign a respective initial price value to each router which is associated with the network performance parameter at the router, and
  the apparatus comprising loop control means operable to:
   (i) receive respective measures of actual network performance at each of the routers,
   (ii) calculate for each router, a plurality of difference values which are the respective differences between the actual performance and the predetermined set point for each router,
   (iii) adjust the price value for each router by a predetermined factor based on the respective difference value,
   (iv) generate a flow price value for each user of the network by combining the price values for each of the routers in the path of the respective user's desired data flow through the network,
   (v) allocate a resource share value for each user which represents the value of the respective WtP value taking account of the respective flow price value, and
   (vi) cause the ingress router for each user to restrict flow into the network ingress from each user in accordance with each user's allocated resource share value,
  whereby the actual network performance at each router is made to converge to the set point value for the respective router by automatic admission control adjustment at the network ingress router.

10. Computer software which when executed, operates to manage resources in a switched network having a measurable actual network performance and being arranged to have a plurality of users each having a respective desired data flow through the network from a respective network ingress at a respective ingress router, by performing the steps of:
  (a) assigning a respective WtP value to each of a plurality of network users,
  (b) assigning respective set point values for a network performance parameter for each of a plurality of routers in the network,
  (c) assigning a respective initial price value to each router which is associated with the network performance parameter at the router, and (d) operating a first control loop which is operable to:
   (i) receive respective measures of the actual network performance at each of the routers,
   (ii) calculate for each router, a plurality of difference values which are the respective difference between the actual performance and the set point for each router,
   (iii) adjust the price value for each router by a factor based on the respective difference value,
   (iv) generate a flow price value for each user by combining the price values for each of the routers in the path of the respective user's desired data flow through the network,
   (v) allocate a resource share value for each user which represents the value of the respective WtP value and takes account of the respective flow price value, and
   (vi) cause the ingress router for each user to restrict flow into the network ingress from each user in accordance with each user's allocated resource share value,
  whereby the actual network performance at each router is made to converge to the set point value for the respective router by automatic admission control adjustments at the network ingress routers.

11. A telecommunications network including admission control apparatus for a network being arranged to:
  (a) record a predetermined respective WtP value for each of a plurality of network users, each of the users being coupled to the network via an ingress router,
  (b) record respective predetermined set point values for a network performance parameter for each of a plurality of routers in the network, and
  (c) to assign a respective initial price value to each router which is associated with the network performance parameter at the router, and
  the apparatus comprising loop control means operable to:
   (i) receive respective measures of actual network performance at each of the routers,
   (ii) calculate for each router, a plurality of difference values which are the respective differences between the actual performance and the predetermined set point for each router,
   (iii) adjust the price value for each router by a predetermined factor based on the respective difference value,
   (iv) generate a flow price value for each user of the network by combining the price values for each of the routers in the path of the respective user's desired data flow through the network,
   (v) allocate a resource share value for each user which represents the value of the respective WtP value and takes account of the respective flow price value, and
   (vi) cause the ingress router for each user to restrict flow into the network ingress from each user in accordance with each user's allocated resource share value,
  whereby the actual network performance at each router is made to converge to the set point value for the respective router by automatic admission control adjustments at the network ingress router.

* * * * *